3,381,048
ISOMERIZATION OF XYLENE ISOMERS

Lyle M. Lovell, Portage, Ind., and Erwin R. Strong, Flossmoor, Ill., assignors to Standard Oil Company, Chicago, Ill., a corporation of Indiana
No Drawing. Filed Sept. 16, 1965, Ser. No. 487,898
5 Claims. (Cl. 260—668)

ABSTRACT OF THE DISCLOSURE

An improvement in the process for isomerizing xylene isomers over a regenerable platinum-alumina-halogen catalyst comprising the use of dry conditions during isomerization and wet conditions during catalyst regeneration. The process conditions are controlled so that the water content of the hydrocarbon process stream during isomerization is between about 20 and 200 parts-per-million by weight and the content of the regeneration gas stream is between about 3,000 and 20,000 parts-per-million by volume.

---

This invention relates to improvements in processes for the isomerization of xylene isomers wherein a hydrocarbon fraction containing said isomers is contacted under isomerization conditions with a platinum-alumina-halogen catalyst. More particularly, this invention relates to such a process wherein the water content of the isomerization process and the catalyst regeneration gas streams are each controlled in a particular manner in order to produce improved isomerization results.

The use of platinum-alumina-halogen catalysts to effect hydrocarbon isomerization is well known. It is also recognized in the art that such a catalyst is useful for isomerization of xylene isomers. Experience with conducting hydrocarbon conversion reactions over platinum-alumina-halogen catalyst has shown that the presence of water in the process stream and in the catalyst regeneration gases results in loss of halogen from the catalyst. This halogen must be replaced in order to maintain catalytic activity. Therefore, during regenerative-type operation, it has been found desirable to dry the feed and recycle hydrogen and also to maintain the water content of the catalyst regeneration gases at a low level. This type of operation is labeled herein as dry regeneration-dry process. Where water is not removed from the process stream or the regeneration gases, the process is called wet regeneration-wet process.

In order to minimize halogen loss from the catalyst and consequent corrosion problems, it is most desirable to operate hydrocarbon conversion processes employing platinum-alumina-halogen catalyst under dry regeneration-dry process conditions. However, the surprising discovery has now been made that a xylene isomerization process employing platinum-alumina-halogen catalyst produces much improved results when operated under wet regeneration-dry process conditions. By the term dry process conditions as used herein is meant a water content in the hydrocarbon process stream of between about 20 and about 200 parts of water per million parts by weight of hydrocarbon feed (p.p.m. by weight), preferably between about 20 and about 100 p.p.m. by weight. By the term wet regeneration conditions as used herein is meant a water content of the catalyst regeneration gases of at least about 3,000 parts of water per million parts of regeneration gases by volume (p.p.m. by volume) up to about 20,000 p.p.m., preferably a water content in the range of about 3,000 to about 6,000 p.p.m. by volume.

According to the present invention there is provided the improvement in a xylene isomerization process where-in a $C_8$ aromatic hydrocarbon fraction is subjected to isomerization under isomerization conditions in the presence of a platinum-alumina-halogen catalyst wherein said catalyst is periodically regenerated by isolating said catalyst from said hydrocarbon fraction and removing carbon-containing deposits from said catalyst by contacting said catalyst under regeneration conditions with oxygen-containing regeneration gas and thereafter resuming contacting of said hydrocarbon fraction with said regenerated catalyst, which improvement comprises maintaining dry process conditions during said isomerization and wet regeneration conditions during said regeneration. The water content of the process stream under said dry conditions is maintained between about 20 and about 200 p.p.m. by weight based on said hydrocarbon fraction, preferably between about 20 and about 100 p.p.m. by weight, and the water content of regeneration gases introduced to the catalysts during the said regeneration is maintained above at least about 3,000 p.p.m. by volume.

Suitable platinum-alumina-halogen catalysts for use in the process of this invention are those catalysts which have been found eminently suitable for use in naphtha hydroforming processes. Generally, these catalysts contain from about 0.01 to about 10 percent by weight of platinum and from about 0.05 to about 3 percent by weight of a halogen, preferably chlorine and/or fluorine, on a high surface area alumina support such as the alumina described in Heard Reissue Patent No. 22,196. The catalyst may be in the form of pills, pellets, extrudates, spheres, or the like, and conventionally have a size of about $\frac{1}{16}''$ to $\frac{1}{4}''$ in maximum dimension.

Chloride is the preferred halogen for use in the platinum-alumina-halogen catalyst, the preferred amount being in the range of about a 1:1 to a 2:1 weight ratio of chloride to platinum in the catalyst. This chloride level may be conveniently maintained either by addition of chloride-affording substances to the feed or by treating the regenerated catalyst with a chloride-affording substance, e.g. carbon tetrachloride, prior to returning the catalyst to processing conditions, or both.

The $C_8$ aromatic hydrocarbon feed for the process of this invention may conveniently be recovered by distillation from any hydrocarbon stream containing a suitable quantity of $C_8$ aromatics. A particularly convenient source of $C_8$ aromatic feed is mother liquor obtained from a paraxylene crystallization process.

The process of this invention may be used to effect the net production of any one or more of the $C_8$ aromatic isomers, i.e. o-oxylene, m-xylene, p-xylene and/or ethyl benzene, from $C_8$ aromatic mixtures. Para-xylene, for example, can be recovered from the presence of other xylene isomers by fractional crystallization. However, the para-xylene concentration of the charge to the crystallizer is desirably as high as possible, because the amount of para-xylene which can be recovered by crystallization increases with the para-xylene concentration in the crystallizer feed. For example, if para-xylene concentration in the feed to a crystallizer unit is about 21 weight percent, the para-xylene recovery is about 62 weight percent; however, if the para-xylene concentration in the crystallizer feed is 16 percent, only about 48 percent of the para-xylene may be recovered. The equilibrium concentration for para-xylene in $C_8$ aromatic mixtures is 20–23 weight percent in the reaction temperature range of 400–1,000° F.

The process of this invention may be carried out with the catalyst in a fixed-bed reactor employing a recycle hydrogen stream to suppress coke formation. Processing may be continued until the catalyst activity declines to an uneconomic value, and then the processing discontinued for regeneration of the catalyst (coke removal) followed by resumption of processing. Preferably, a swing-reactor is employed so that processing may be continued in one or more reactors during the time that catalyst in another one or more reactors is being regenerated.

Suitable isomerization conditions for use in this invention include a pressure in the range of about 100 to 1,000 p.s.i.g., preferably about 250 to 400 p.s.i.g., a kinetic average temperature in the range of about 850 to 975° F., preferably in the range of about 900 to 940° F., a weight hourly space velocity in the range of about .5 to 2 pounds of oil per hour per pound of catalyst ($W_o$/hr.$_c W_c$) preferably in the range of about 1.0 to 1.5 $W_o$/hr./$W_c$. Hydrogen is included with the feed in order to suppress coke deposition on the catalyst, a suitable hydrogen rate being in the range of about 2,000 to 10,000 standard cubic feet of hydrogen per barrel of hydrocarbon feed (s.c.f./bbl.), preferably in the range of about 3,000 to 8,000 s.c.f./bbl.

Example

To illustrate our invention and its advantages a preferred embodiment thereof will be described and compared with dry process-dry regeneration conditions. A feedstock of pure meta-xylene (99+ mol percent m-xylene) was charged to an isomerization plant to simulate m-xylene recycle from a xylene separation process. A platinum-alumina-halogen catalyst containing 0.6 wt. percent platinum and 0.6 wt. percent chloride was employed. The hydrogen input rate was in the range of about 5,500 to 8,000 s.c.f. of hydrogen per barrel of xylene feed. Other operating conditions are shown in the Table. The water content of the process stream at the reactor outlet during wet regeneration-dry process conditions was in the range of 20–100 p.p.m. by wt., based on xylene feed. Dry regeneration conditions where employed were maintained by controlling the water content of the regeneration gases entering the catalyst bed below about 100 p.p.m. by volume. Under dry regeneration-dry process conditions the water content of the reactor effluent stream was below 25 p.p.m. by weight based on xylene feed. Where wet regeneration conditions were employed, the regeneration gases entering the catalyst bed contained about 3,000 to 6,000 p.p.m. by volume of water.

TABLE

| | Processing Method | |
|---|---|---|
| | Dry Regenerations, Dry Processing | Wet Regenerations, Dry Processing |
| Operating Conditions: | | |
| Average Catalyst Temp., °F | 922 | 925 |
| Space Velocity, $W_o$/hr./$W_c$ | 1.06 | 1.05 |
| Pressure, p.s.i.g | 300 | 300 |
| Xylene Product Isomer Distribution, wt. percent: | | |
| Ethylbenzene | 1.1 | 1.9 |
| o-Xylene | 10.1 | 14.7 |
| m-Xylene | 76.1 | 64.2 |
| p-Xylene | 12.7 | 19.2 |

Thus it can be seen that employing the wet regeneration-dry process conditions of the present invention results in a closer approach to thermodynamic equilibrium isomer distribution as shown by the greater conversion of the meta-xylene feed to the other $C_8$ aromatic isomers.

While the invention has been described with reference to particular embodiments thereof, it is to be understood that equivalents apparent to those skilled in the art are deemed to be within the scope of the invention.

What is claimed is:

1. In a xylene isomerization process wherein a $C_8$ aromatic hydrocarbon is subjected to isomerization under isomerization conditions in the presence of a platinum-alumina-halogen catalyst and wherein said catalyst is periodically regenerated by isolating said catalyst from said hydrocarbon and removing carbon-containing deposits from said catalyst by contacting said catalyst under oxidation conditions with oxygen-containing regeneration gas, and thereafter resuming contact of said hydrocarbon with said regenerated catalyst, the improvement which comprises maintaining dry process conditions during said isomerization and wet regeneration conditions during said regeneration, the water content of the process stream under said dry process conditions being maintained below about 200 p.p.m. by weight, based on said hydrocarbon, and the water content of the regeneration gases introduced to said catalyst during said wet regeneration being maintained above at least about 3,000 p.p.m. by volume.

2. The process of claim 1 wherein said dry process conditions are obtained by drying the hydrocarbon fraction feed to said isomerization to a water content below about 25 p.p.m. by weight.

3. In an alkyl aromatic hydrocarbon isomerization process wherein an alkyl aromatic hydrocarbon is contacted with a noble metal-alumina-halogen isomerization catalyst in the presence of hydrogen under isomerization conditions and wherein said catalyst is periodically regenerated by isolating said catalyst from said hydrocarbon and removing carbon-containing deposits from said catalyst by contacting said catalyst under oxidation conditions with oxygen-containing regeneration gas, and thereafter resuming contact of said hydrocarbon with said regenerated catalyst, the improvement which comprises maintaining the water content of the hydrocarbon process stream in contact with said catalyst within the range of 20 to 200 p.p.m. by weight, based on hydrocarbon feed, and maintaining the water content of said regeneration gas contacting said catalyst above at least about 3,000 p.p.m. by volume.

4. The process of claim 3 wherein said catalyst is platinum-alumina-chlorine catalyst containing 0.1 to 1.0 wt. percent platinum and 0.1 to 1.0 wt. percent chlorine.

5. The process of claim 3 wherein said alkyl aromatic hydrocarbon consists essentially of xylene isomers and ethyl benzene.

References Cited

UNITED STATES PATENTS 2,781,324  2/1957  Haensel.
3,011,967  12/1961  Schmitkons et al. ____ 208—139
3,078,318  2/1963  Berger _____ 260—668

DELBERT E. GANTZ, *Primary Examiner.*

C. R. DAVIS, *Assistant Examiner.*